United States Patent
Damodhar

(10) Patent No.: US 7,739,678 B2
(45) Date of Patent: Jun. 15, 2010

(54) MANAGING UPDATES IN AN OBJECT ORIENTED SOFTWARE SYSTEM

(75) Inventor: Palani Damodhar, Bangalore (IN)

(73) Assignee: SAP AG, Walldorf (DE)

( * ) Notice: Subject to any disclaimer, the term of this patent is extended or adjusted under 35 U.S.C. 154(b) by 748 days.

(21) Appl. No.: 11/307,911

(22) Filed: Feb. 28, 2006

(65) Prior Publication Data

US 2007/0203953 A1    Aug. 30, 2007

(51) Int. Cl.
G06F 9/44 (2006.01)

(52) U.S. Cl. .................. 717/168; 717/173; 717/178

(58) Field of Classification Search .......... 717/168–178
See application file for complete search history.

(56) References Cited

U.S. PATENT DOCUMENTS

| 6,282,709 B1 * | 8/2001 | Reha et al. ................. 717/175 |
| 6,347,397 B1 * | 2/2002 | Curtis ........................ 717/170 |
| 6,360,255 B1 * | 3/2002 | McCormack et al. ....... 709/221 |
| 6,442,754 B1 * | 8/2002 | Curtis ........................ 717/175 |
| 2005/0097543 A1 * | 5/2005 | Hirayama ................... 717/168 |

* cited by examiner

Primary Examiner—Wei Y. Zhen
Assistant Examiner—Phillip H Nguyen
(74) Attorney, Agent, or Firm—Kenyon & Kenyon LLP

(57) ABSTRACT

The invention relates to the update, correction or upgrade of a software system through an update file. Firstly, objects included in or modified by the update file can be displayed to the user. Secondly, checks of the software system to be updated are made to look for related objects which are associated with the objects included in the update file. This helps reduce inconsistencies in the software system and accordingly smooths the updating process.

13 Claims, 5 Drawing Sheets

Figure 1

| Software Component | SAP_APPL | SAP Application |
| --- | --- | --- |
| Transport file | K9CK000631 | |
| Last Changed on | 05.01.2005 | |
| Status/ Format | Released | 2 |

Object List

| Obj | Obj. name |
| --- | --- |
| REPS | LTXW0EF81 |
| REPS | RTXWS12E |
| | |
| | |
| | |

☐ Changes/Objects Not Contained in SAP Standard

Valid for

| Software Component | Release | Frm | To |
| --- | --- | --- | --- |
| SAP_APPL | 470 | 470 | SAPKH47022 |
| | | | |
| | | | |

Not Valid for

| Software Component | Release | Frm | To |
| --- | --- | --- | --- |
| | | | |
| | | | |

Figure 2

MANAGING UPDATES IN AN OBJECT ORIENTED SOFTWARE SYSTEM

FIELD OF THE INVENTION

The present invention relates to the update, correction or upgrade of an object oriented software system.

BACKGROUND OF THE INVENTION

A software provider is regularly required to provide updates or modifications to their software system. These updates may, for example, provide the software system with additional functionality requested by users, or the updates may correct errors contained in previous releases of the software. In an object oriented software system, there may be a requirement to deliver a complete function group or package, or to provide DDIC (data dictionary) objects.

This update process may be accomplished by means of update files, which can often simply be downloaded via a computer network. These update files will typically be compressions of the objects necessary for implementing the update, and each object may be a list of programs, tables, function modules, function groups or other elements. The user can simply download the update file and implement the update, usually with just a few mouse-clicks. This creates or modifies the relevant objects in the software system, without requiring the user to know or understand all of the details of the update.

However, this approach does pose some difficulties, as often a user does not implement all updates immediately, does not implement them in the order that they issue, or sometimes does not even implement certain updates at all. Unfortunately, in some cases, a new update will not function as intended unless a previous update has been implemented. This can lead to scenarios wherein an update that may have been intended to improve system performance actually causes more errors and lowers system performance.

The present invention aims to reduce or eliminate some or all of the disadvantages of prior software updating methods.

SUMMARY OF THE INVENTION

Accordingly, in a first aspect of the present invention, there is provided a method for providing update information to a user for an update to a software system, the method comprising (a) displaying to the user a file identifier for an update file, the update file including one or more objects for implementation in said software system; and (b) displaying to the user a list of the object identifiers for the objects included in said update file. The method may also include allowing a user to optionally request the performance of step (b).

The method may further include, upon the user's request, electronically contacting the provider of the update to obtain said list of object identifiers for the objects included or modified in said update file.

In a second aspect of the present invention, there is provided a system for providing update information for an update to a software system to a user, comprising a processor to identify an update file with a file identifier, and to identify one or more objects included in the update file with one or more object identifiers; and a display to display said file identifier and object identifiers.

In a third aspect of the present invention, there is provided a method for processing an update of a software system, the update including an update file, the method comprising (i) identifying one or more objects included in the update file; (ii) identifying one or more related objects associated with the one or more objects included in the update file; (iii) checking for the presence of said one or more related objects in the software system; and (iv) identifying at least one further update file which includes said one or more related objects.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF THE DRAWINGS

An illustrative embodiment of the present invention will be discussed with reference to the accompanying drawings wherein:

FIG. 1 depicts a screen displaying file identifiers for update files;

FIG. 2 depicts a screen displaying object identifiers for objects included in an update file;

DETAILED DESCRIPTION

Figure 1:
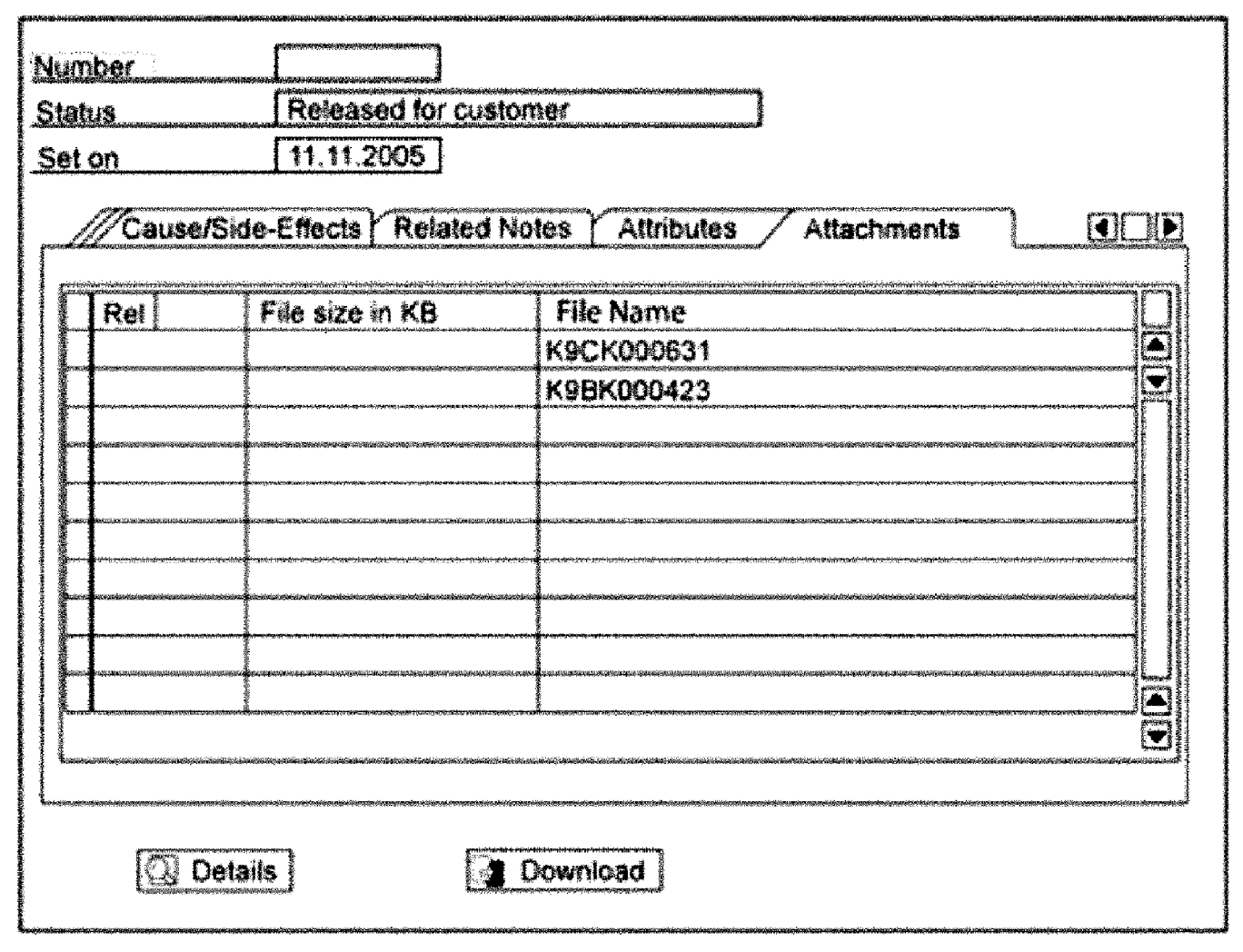

Referring to FIG. 1, there is shown a screen displayed to a user with information regarding an update to an object oriented software system. There are depicted four tabs—the first three tabs relate to various update information, and the fourth tab relates to update files associated with the update. As shown in FIG. 1, there are displayed two file identifiers for update files, identified (in this instance) as K9CK000631 and K9CK000423. However, from the information displayed on this screen the user does not know what objects are included in the respective update file.

Therefore, according to the present invention, the user may double click on a file identifier for an update file. If, for example, the user double clicks on the file identifier K9CK000631, the screen shown in FIG. 2 will be displayed. Of particular note in this screen is that there are two objects listed, identified with the object identifiers LTXW0EFB1 and RTXWSIZE. As described in relation to the background, each object may be a list of programs, tables, function modules, function groups or other elements; however, the content of each object need not be displayed.

Of course, alternative embodiments could be provided which use other operations to trigger the display to the user of the screen of FIG. 2. For example, a single mouse click or keystroke could be used, or a separate button displayed on the screen. It would even be within the scope of the invention to display the list of object identifiers automatically and simultaneously with the display of the update file identifiers.

From the screen depicted in FIG. 1, the user can electronically obtain the desired update file(s) via a computer network by clicking on the "Download" button.

Figure 3:
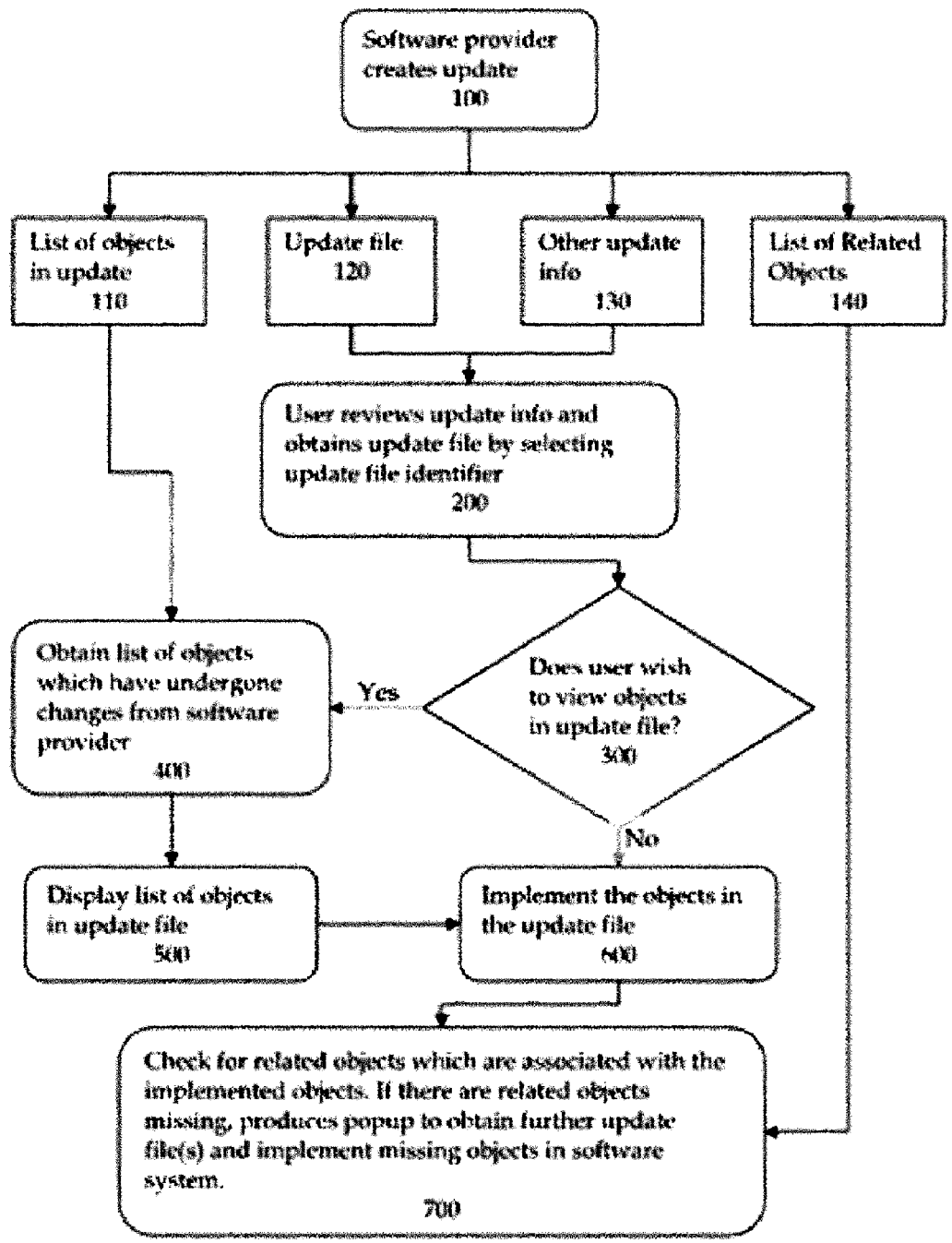
FIG. 3 depicts a general overview of steps performed according to an embodiment of the present invention.

FIG. 3 depicts a general overview of the entire process of providing an update according to the present invention. Initially, the update must be created as shown at 100 by the software provider. Generally, the software provider will utilise a test system to address errors with the provided software system, or to add functionality. Therefore, the software provider will initially create new objects in the test system, test the functionality of these new updates within the test system to ensure the new or changed objects function appropriately, and then will make the update available to a user.

According to one embodiment of the present invention, when providing an update to a user, the software provider will make available not only an update file 120, but also a list of objects 110 included in the update file 120, other information 130 regarding the update (e.g. the reason for its release, the problems it addresses, or any side effects that may occur), as well as a list of related objects 140 which are associated with the objects included in the update file 120. Of course, there may in some instances be only a single object included in the update file 120, or only a single related object associated with the objects included in the update file 120.

Once the update is made available, the user then is able to review the update information and obtain the update file 200. At this point, the user may choose as shown at 300 whether to view the objects included in the update file 120. If the user does wish to view the objects, then the list of objects 110 is obtained 400 from the software provider and relevant object identifiers are displayed as shown at 500 to the user. Once the user has viewed the list of objects, the software system can be updated by implementing as shown at 600 the objects included in the update file.

However, this still leaves the problem that the new update may rely on objects provided in previous updates, and these previous updates may not yet have been implemented by the user. Related objects may be associated in different ways for example, an updated object might be associated with a related object because it sends messages to the related object, or it might send messages to other objects instructing them to send messages to the related object, or a related object might be identified or returned by methods of the updated object. However, the abovementioned examples are not an exhaustive list of ways in which objects may be associated.

Accordingly, the system also performs a check 700 for related objects which are associated with the implemented objects. If there are related objects missing, then further update files which include the related objects must be identified. This may also be performed by looking up a table provided by the software provider. A popup can then appear, prompting the user to obtain the further update files and implement the related objects in the software system. Of course, it would be within the scope of the invention to simply perform this step automatically, without the user's confirmation.

Figure 4:
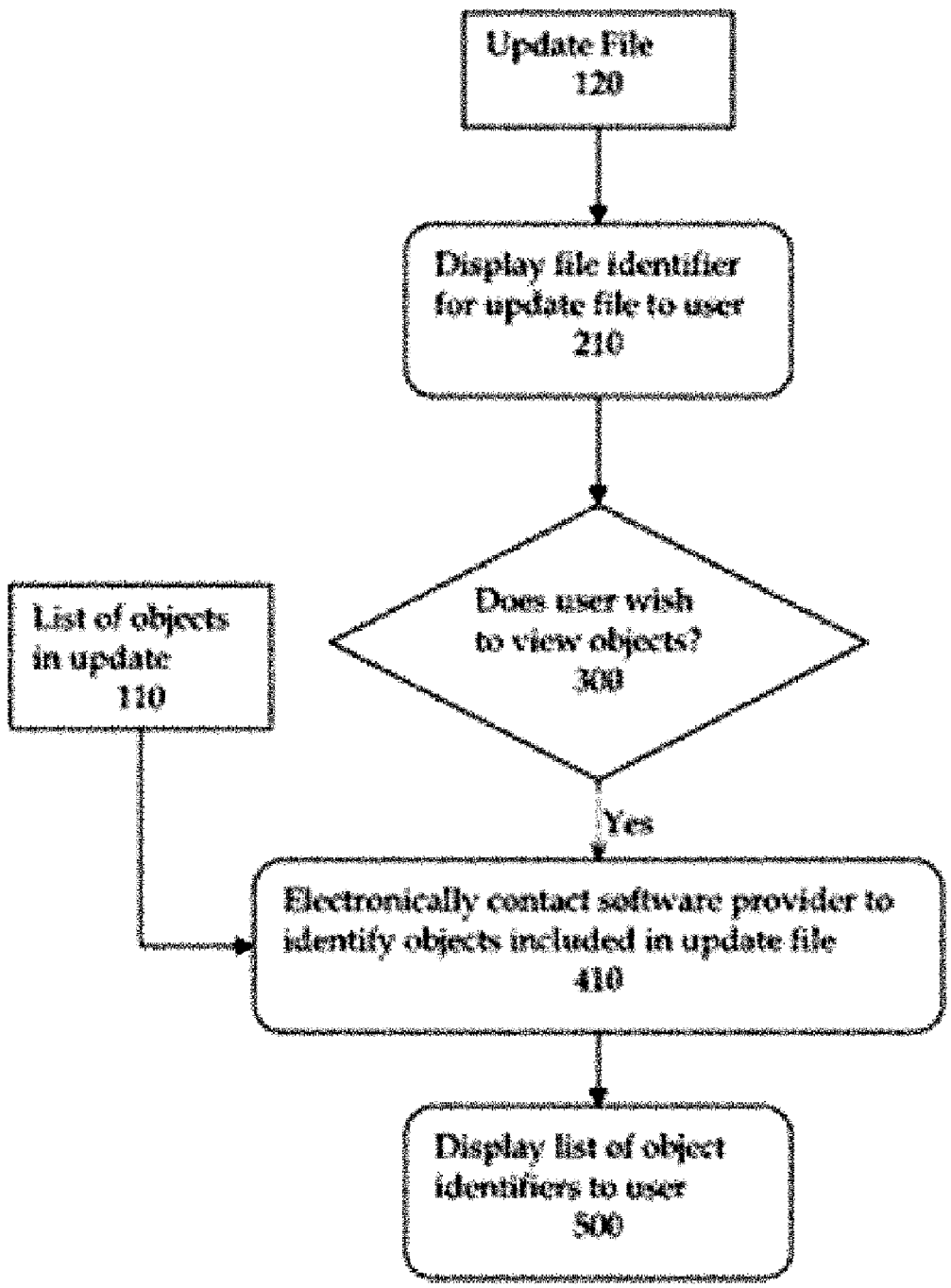
FIG. 4 depicts in more detail steps relating to the first aspect of the present invention, according to one embodiment.
Figure 5:
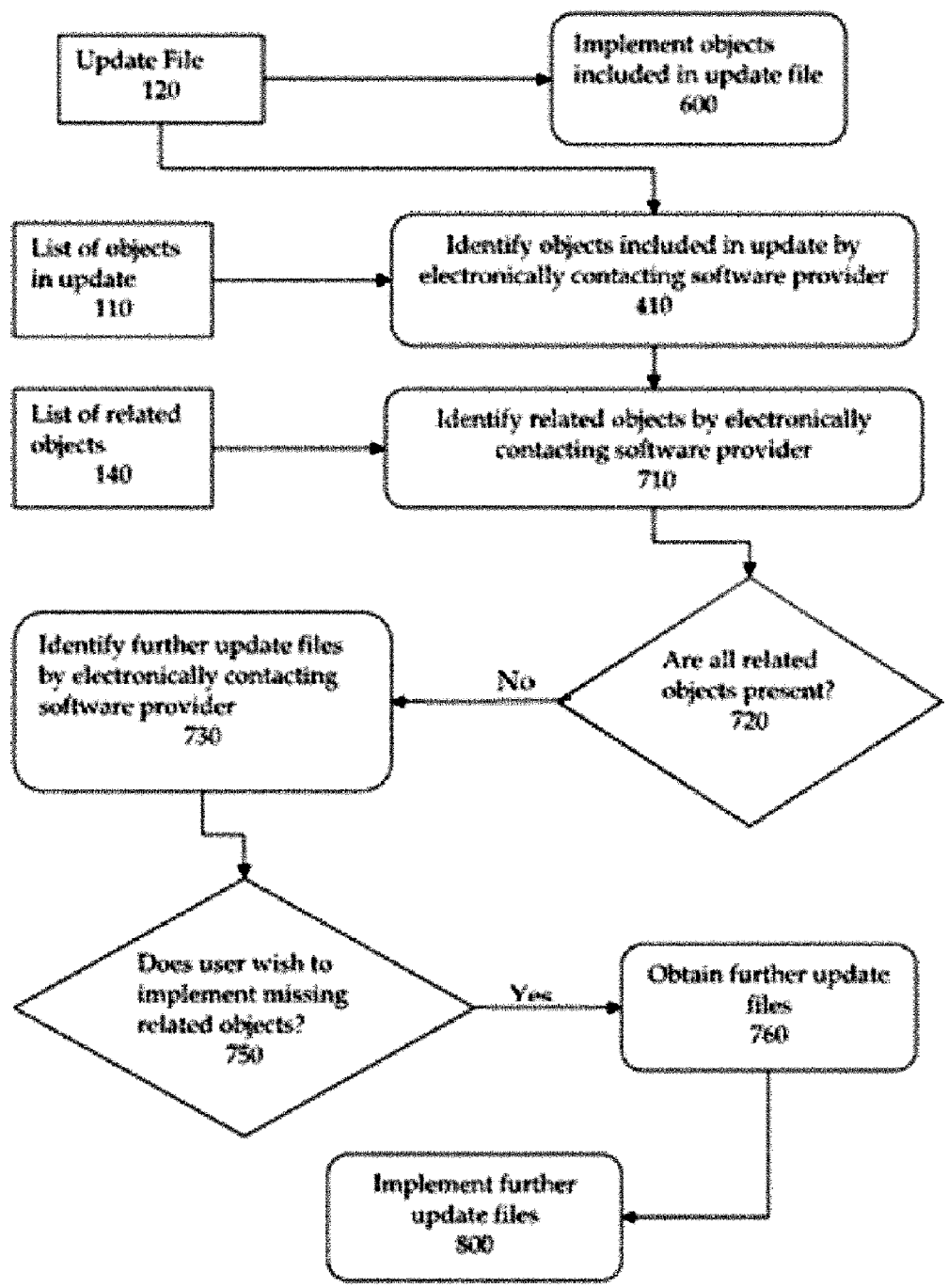
FIG. 5 depicts in more detail steps relating to the third aspect of the present invention, according to one embodiment.

FIGS. 4 and 5 depict in more detail the steps described above with reference to FIG. 3. Referring to FIG. 4, a file identifier relating to the update file 120 is displayed to the user referenced at 210, who then is able to choose whether to view the objects 300 in the update file. If the user would like to view the objects, then the software provider is electronically contacted to identify the objects in the update file 410, from the list of objects 110 created by the software provider. Object identifiers can then be displayed to the user 500 for each object in the list 110.

FIG. 5 depicts in more detail steps relating to the third aspect of the present invention, according to one embodiment. On receipt of the update file 120, the objects should be implemented as shown at 600 in the software system (of course, this step may only be done at the user's request). The objects in the update file are, in this instance, identified from the list of objects 110 by electronically contacting the software provider referenced at 410. Then the related objects related objects associated with the objects included in the update file must be identified, which can be done by electronically contacting the software provider referenced at 710 to obtain the list of related objects 140. A check is then conducted as shown at 720 to determine whether all related objects are present in the software system. Clearly, if all related objects are present and up-to-date, then there is no need for further action. However, if there are objects missing, then further update files are identified by electronically contacting the software provider referenced at 730. If the user wishes to implement the missing related objects referenced at 750, the further update files are obtained as shown at 760 and then implemented as shown at 800.

Clearly, the steps shown in FIGS. 3 to 5 are not intended to be exhaustive of all the steps accomplished, and additional steps not shown may be performed at any point in the process, as desired. FIGS. 4 and 5 are simply intended to highlight the important steps for the present invention. Clearly, some of the described and depicted steps are optional, and are presented only with regards to this embodiment of the present invention.

For example, in FIG. 4, providing the user with the option to view objects 300 is not essential to the present invention. Furthermore, although in this embodiment the software provider is contacted electronically 410 to identify the objects included in the update file, it would be possible to simply examine the update file 120 in detail, to thereby determine the objects included therein.

Similarly, in relation to the other identification steps (710, 730) shown in FIG. 5, these steps could also be accomplished by other means. Other variations would include removing the user decision 750 regarding whether to obtain further update files 760 and implement them 800 in the software system. In most circumstances, the update file will be a compressed file, and a separate and specialised update system will be used to decompress the file. The update system would also be responsible for creating the objects in the computer memory in which the software system resides, and/or saving required information to a computer readable medium such as a hard disk.

Although an embodiment of the present invention has been described in the foregoing detailed description, it will be understood that the invention is not limited to the embodiment disclosed, but is capable of numerous rearrangements, modifications and substitutions without departing from the scope of the invention. Modifications and variations such as would be apparent to a skilled addressee are deemed within the scope of the present invention.

It should be also appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

What is claimed is:

1. A computer-implemented method for providing update information for an update to a software system to a user, the method comprising:
   (a) displaying to the user, a user interface including a plurality of tabs, each tab relating to different update information;
   (b) responsive to a user selection of an update file tab, displaying to the user a plurality of file identifiers for update files, each update file including one or more objects for implementation in said software system;
   (c) responsive to a user selection an update file, displaying to the user a list of one or more object identifiers for the one or more objects included in said update file;
   (d) obtaining, by a provider a list of one or more related objects which are associated with the one or more objects but not included in the update file;
   (e) checking for the presence of said one more related objects in the software system;
   (f) displaying to the user a list of one or more further update file identifiers for at least one further update file which includes said one or more related objects not present in the software system but excludes file identifiers for related objects already present in the software system;
   (g) displaying to the user, an option to select one or more related objects not already present in the software system;
   (h) responsive to user selection of at least one of the file identifiers for the related objects not present in the software system, constructing, by the provider said at least one further update file that includes only the selected related objects and excludes non-selected related objects; and
   (i) transmitting to the user said update file and said at least one further update file for implementation in the software system.

2. A computer-implemented method according to claim 1, further comprising:
   (j) performing step (c) responsive to the user's request.

3. A computer-implemented method of according to claim 2, further comprising:
   (k) upon the user's request in step (j), electronically contacting the provider of the update to identify the objects included or modified in said update file.

4. A computer-implemented method for processing an update of a software system, the update including an update file, the method comprising:
   (i) displaying an update file tab from a plurality of user interface tabs, each tab relating to update information;
   (ii) receiving a user selection the update file from a plurality of update file identifiers displayed in the update file tab;
   (iii) selecting one or more objects included in the update file;
   (iv) determining one or more related objects which are associated with the one or more objects but are not included in the update file;
   (v) checking for the presence of said one or more related objects in the software system;
   (vi) receiving a selection for at least one further update file which includes said one or more related objects not present in the software system but excludes related objects already present in the software system;
   (vii) providing an option to select one or more related objects not already present in the software system;
   (viii) responsive to user selection of at least one or more related objects not present in the software system, providing from a provider said at least one further update file that includes only the selected related objects and excludes non-selected related objects;
   (ix) obtaining said update file and said at least one further update file; and
   (x) implementing the one or more objects included in said update file and the one or more related objects not present in the software system included in said at least one further update file, in the software system.

5. A computer-implemented method according to claim 4, wherein step (iv) is accomplished by looking up a table or list made available by the update provider.

6. A computer-implemented method according to claim 4, wherein step (v) is accomplished by looking up a table or list made available by the update provider.

7. A computer-implemented method according to claim 4, wherein either or both of steps (ix) and (x) are performed at a user's request.

8. A computer-implemented method according to claim 4, further comprising:
   (xi) displaying to a user a list of one or more object identifiers for the one or more objects included in said update file.

9. A system for providing update information for an update to a software system to a user, comprising:
   a processor to provide a user interface including a plurality of tabs, each tab relating to different update information, to provide an update file with a file identifier, to select one or more objects included in the update file with one or more object identifiers, to determine one or more related objects which are associated with the one or more objects but are not included in the update file with one or more related object identifiers, to check for the presence of said related objects in the software system, to determine at least one further update file which includes said one or more related objects not present in the software system but excludes file identifiers for related objects already present in the software system with further update file identifiers, to provide an option to select one or more related objects not already present in the software system, responsive to user selection of at least one or more related objects not present in the software system, to receive from a provider said at least one further update file that includes only the selected related objects and excludes non-selected related objects, and to implement said update file and said at least one further update file in the software system responsive to user's request; and
   a display to display said user interface, file identifier, object identifiers, related object identifiers, and further update file identifiers.

10. A system according to claim 9, further comprising:
    an input to receive input instructions from a user.

11. A system for processing an update of a software system, the update including an update file, the system comprising:
    a processor to provide a user interface including a plurality of tabs, each tab relating to different update information, to provide an update file tab that includes the update file, to select one or more objects included in the update file, to determine one or more related objects which are associated with the one or more objects but are not included in the update file, to check for the presence of said related objects in the software system, to determine at least one further update file which includes said related objects not present in the software system but excludes related objects already present in the software system, to provide an option to select one or more related objects not already present in the software system, responsive to user selection of at least one or more related objects not present in the software system, to construct by a provider said at least one further update file that includes only the selected related objects and excludes non-selected related objects, and to transmit said update file and said at least one further update file to the user for implementation in the software system responsive to user's request.

12. A computer-readable storage medium encoded with data representing a computer program that can be used to direct a programmable device to perform the method of claim 1.

13. A computer-readable storage medium encoded with data representing a computer program that can be used to direct a programmable device to perform the method of claim 4.

* * * * *